United States Patent [19]

Skala

[11] 3,915,570
[45] Oct. 28, 1975

[54] OPTICAL FLUID CONTAMINATION AND CHANGE MONITOR METHOD AND APPARATUS

[75] Inventor: George Frank Skala, Scotia, N.Y.

[73] Assignee: Environment/One Corporation, Schenectady, N.Y.

[22] Filed: Aug. 20, 1970

[21] Appl. No.: 65,410

[52] U.S. Cl. .................. 356/73; 250/565; 250/573; 356/104; 356/205
[51] Int. Cl.² ........................................ G01N 21/26
[58] Field of Search .......... 250/218; 356/36, 70, 72, 356/181, 186, 102–104, 208, 246, 73

[56] References Cited
UNITED STATES PATENTS

| | | | |
|---|---|---|---|
| 2,819,608 | 1/1958 | McLaren et al. ............... | 356/104 X |
| 3,078,756 | 2/1963 | Barton, Jr. et al. ............. | 356/104 |
| 3,200,700 | 8/1965 | Topol ............................. | 356/104 |
| 3,234,846 | 2/1966 | Cropper et al. ................. | 356/104 |
| 3,236,602 | 2/1966 | Isreeli ............................ | 356/246 X |
| 3,309,524 | 3/1967 | Goodman ........................ | 356/36 |
| 3,345,910 | 10/1967 | Rosin et al. ..................... | 356/181 |
| 3,354,772 | 11/1967 | Topol ............................. | 356/104 X |
| 3,480,784 | 11/1969 | Pierce ............................ | 356/246 UX |
| 3,560,099 | 2/1971 | Boe et al. ........................ | 356/246 |

FOREIGN PATENTS OR APPLICATIONS 1,198,585 8/1965 Germany ............................ 356/104

Primary Examiner—Ronald L. Wibert
Assistant Examiner—F. L. Evans
Attorney, Agent, or Firm—Charles W. Helzer

[57] ABSTRACT

An optical oil monitor that measures particle contamination in oil by passing light through an oil sample and picking up the light that is scattered at 90° by the particle contamination and measures chemical breakdown by the attenuation of the light passing substantially straight through the oil with a second sensor, all without errors caused by air bubbles and foaming. Errors due to bubbles or foam within the liquid sample are eliminated by first filtering out only the bubbles or foam prior to the light passing through the sample. Also, light may be passed through an unfiltered sample for comparison to obtain a differential signal correlated to the amount of foam or bubbles. Alternately a sample and a reference are passed between the light responsive sensors for error correction and calibration so that each sensor will have an output signal alternating between a sample signal and a reference signal. A control signal of the same frequency is provided in combination with a plurality of gates to separate the sample and reference signals. The samples and references are housed within a rotor provided with vanes so that it may be driven as a pump by a motor or be driven by fluid flow as a turbine.

8 Claims, 8 Drawing Figures

INVENTOR
GEORGE F. SKALA
BY Charles Heger
ATTORNEY

OPTICAL FLUID CONTAMINATION AND CHANGE MONITOR METHOD AND APPARATUS

CROSS-REFERENCE TO RELATED APPLICATION

The present invention is an improvement of the invention disclosed in the copending application of George Frank Skala "Optical Fluid Contamination and Change Monitor," filed Aug. 5, 1969, as Ser. No. 847,675 now abandoned. The disclosure of the above application is incorporated herein in its entirety by reference.

BACKGROUND OF THE INVENTION

In lubrication systems for internal combustion engines and hydraulic systems for the control of mechanisms, it is important to know the condition of the oil that is circulated in that excess particle contamination will not only increase the wear rate of moving parts, but that it will also indicate the impending failure of a moving part, for example a bearing, and the chemical breakdown or other change in the oil will mean that its flow characteristics have changed and that it will in many times no longer be suited for its intended purpose. Also, in fuel lines, particularly for aircraft engines, it is important to know if particle contamination is present which would block small conduits, particularly during carburation and if there is a chemical change in the fuel so that it would not properly burn. There are many other areas where it is important to know the particle content of a fluid and its chemical composition, for example for oil well drilling or in water purification.

Optical systems have been used in the past, because of their accuracy and convenience in monitoring some of the above characteristics for fluids. Particularly, particle contamination will produce a scattering of light passed through a fluid and chemical breakdown or other change will affect the transmissibility of the fluid for light passing substantially straight through it. However, such systems are susceptible to considerable errors caused by air bubbles within the oil or other liquid caused by foaming. The presence of foam in the test chamber would increase the light scattering and affect the light attenuation to give a false indication of the amount of particle impurities. Since the amount of foam may have many causes and can vary greatly, the prior art devices cannot be calibrated to compensate for its effects.

These error causing factors will produce false readings for the desired characteristics. There has been no satisfactory way in which to compensate for these errors. In some uses, the mere presence of foam is harmful to the overall system so that its detection would be most useful.

SUMMARY OF THE INVENTION

It is an object of the present invention to overcome the abovementioned disadvantages by providing an oil monitoring system that has a foam filter for eliminating inaccuracies caused by foam presence and for measuring the amount of foaming.

The oil monitor is an on-board real time indicator of the optical properties of the lubrication oil for a gas turbine powered aircraft. Any lubrication system with a circulating oil supply can also be monitored by this device. The instrument is composed of a detector cell through which the lubricating oil passes, and an appropriate electronic data processing circuitry. The latter component may be located in the engine housing or at a remote location.

The function of the oil monitor is to measure the attenuation of a beam of light traversing a given path length of oil, and the amount of light scattered from a volume of the oil, without being effected by foaming. The light attenuation is a measure of chemical degradation of the oil, while the scattering is a function of particulate contamination. For successful long term stable operation, these measurements must be free of effects due to random air bubbles or more intense general foaming. Also, the monitor must not impair the integrity of the oil system, which requires a design to minimize the possibility of catastrophic failure due to leakage or plugging of the monitor head. In uses where oil foaming is undesirable or for some other reason it should be monitored, the system will produce a signal correlated to the amount of foaming.

The present invention employs a reference attenuation and scattering medium for periodically displacing the liquid in order to provide stable reference levels and alternating with foam filtered and unfiltered liquid. This is accomplished by a rotor rotating within the flow of oil. The rotor may be divided into two or four segments, with half of the segments containing semitransparent material which will have a scattering property and an attenuation property similar to that of clean oil or other fluid employed. The other half of the segments will contain short windows with most of the light passed through liquid to be monitored. The short windows will introduce the same amount of attenuation into the ends of the sample paths as is normally produced for the ends of the reference paths.

When four segments are used foam filter means is used for one liquid containing segment so that from the same light source, light will be passed through foam filtered liquid, a reference, unfiltered liquid, and reference material. The light responsive pickup will accordingly produce a repeat pattern of signals for foamless liquid, reference, foam liquid, and reference. The foam and foamless signals may be compared, for example with a differential amplifier, to produce a differential output signal correlated to the amount of foam in the liquid being monitored.

When only two segments are used, foamless liquid will be compared with a reference material for light attenuation and light scattering, i.e., foam in the circuit will be filtered out of the monitor so that it will not affect the instrument readings. Such a system would be used preferably where the presence of foam is not a problem in the remainder of the circuit and there is no need to monitor foam presence.

A single light source is provided for all of the sample and reference materials. Light is conducted to and from the materials by means of fiber optics. Reflecting portions of the rotor produce a signal on a light responsive sensor to indicate to the circuitry when the reference is being measured or alternatively when the sample is being measured.

With the present invention, the system may be independent of the direction of rotation with filters at both ends of the one light chamber for filtered liquid, so that it may be employed with fluid flowing in either direction through the monitor so that the fluid will impinge upon the rotor reaction vanes to provide a turbine action for rotating the rotor, which will in turn produce signals from the light responsive sensors that will have a frequency correlated to the fluid flow, which fluid flow may be indicated by suitable known frequency responsive flow gauge or the like. Also, the rotor may be driven by a suitable motor means so that its peripheral vanes act as a pump for circulating the sample fluid. The system may be easily designed to operate over a wide range of signal frequencies, so that the oil flow rate may vary over a wide range. For example, the unit may operate in flow rate ranges between 1.5 and 20 gallons per minute. The absence of a reference indentification signal or a control signal may be used to trigger a malfunction light or other indicator to show a system breakdown such as light source failure or stoppage of the rotor. The present invention provides a low flow resistance path through the optical system when operating as a turbine.

Photo-resistive cells may be used in that they are available over a wide range of characteristics, ratings, etc. Their sensitivity, linearity and stability have been established through other uses, for example where they have been able to measure as few as 100 droplets per cubic centimeter of air, which droplets measure about 5 microns in diameter. This represents a sensitivity on the order of one part in one hundred million, based on volume ratios. By using similar circuit techniques, the detection of 10 parts per million of oil impurities can be readily accomplished. Also, phototransistors may be used instead of photo-resistive cells.

The versatility of the present invention is shown by the fact that units may be easily constructed for operation with 115 Volt, 60 cycle power or 28 Volt D.C. power or 400 cycle, 115 Volt power, for example. Total power used to operate the oil monitor is about ten watts and its weight when capable of handling a flow of 20 gallons per minute is about 2 pounds. The instrument output is preferably 0–5 Volts D.C. on three channels, one for attenuation, one for scattering, and one for foaming.

As set forth in the above-identified copending application, with the use of common light responsive sensors for each of the reference and sample light pickups, output signals will be produced having a frequency corresponding to the alternation between the sample and reference. A further light responsive sensor combined with at least one reflective surface on the rotor produces a control signal of the same frequency, which may be phase inverted to produce two control frequencies respectively in phase with the sample and reference signals to operate gates in the test and reference circuits for passing only the corresponding test and reference signals. Furthermore, the alternating outputs of the sensors have the advantage that D.C. eliminators may be used in the circuits for removing any D.C. current that would be produced by stray light, circuit noise, etc., which would produce false readings.

BRIEF DESCRIPTION OF THE DRAWING

Further objects, features and advantages of the present invention will become more clear from the following detailed description of a preferred embodiment of the present invention shown in the attached drawing, wherein.

DETAILED DESCRIPTION OF THE DRAWING

Figure 1:
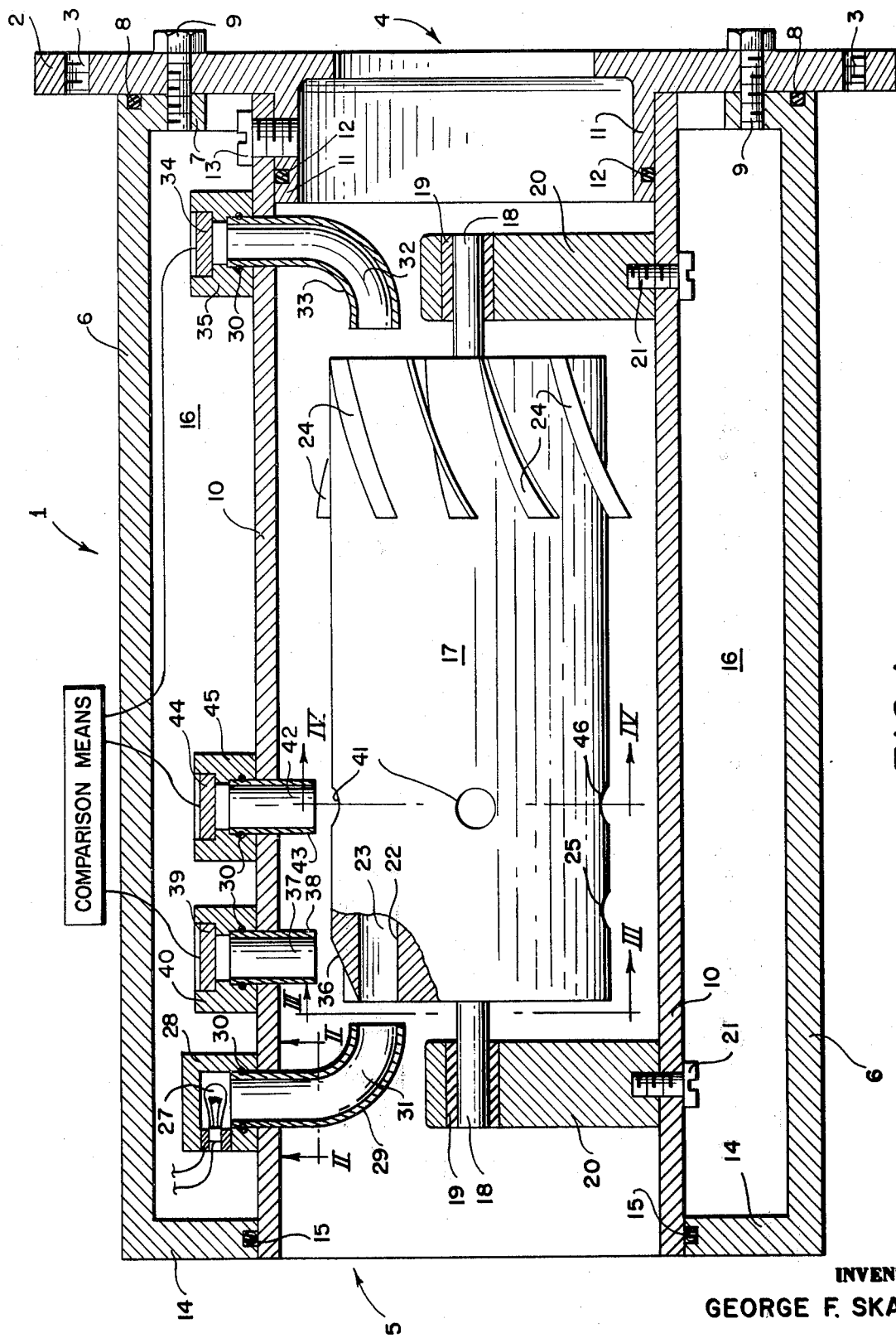
FIG. 1 is a longitudinal cross-sectional view through the mechanical portion of the liquid monitor that is inserted in a liquid sample for passing light through the sample and producing electrical signals in proportion to the effect the sample and a reference have upon the light.

As shown in FIG. 1, the generally cylindrical mechanical portion of the oil monitor according to the present invention comprises a body portion 1 that is mounted within an area containing the sample material to be monitored, for example, which is mounted below the oil level in an internal combustion engine lubricating oil sump. To facilitate this mounting, the body portion 1 is provided with an annular flange 2 which has a plurality of peripheral threaded or through bores 3 to receive mounting screws (not shown). The body portion 1 provides a central through passageway for the sample liquid material, which will preferably be lubricating oil for purposes of a specific example, without any intentioned to be limited solely thereto according to the broader aspects of the invention. The oil may enter or exit from respectively either the central aperture 4 in the annular flange 2 or the aperture 5 at the other end of the body portion 1.

To form the central passageway, the body portion 1 is provided with an outer tube 6 that has an exit flange 7 (the aperture 5 being considered the entrance for purposes of a specific example). The flange 7 is provided with an annular recess containing therein an O-ring 8 for providing a fluid tight seal with the annular flange 2 when the outer tube 6 and annular flange 2 are rigidly secured together by means of the peripherally arranged screws 9.

An inner tube 10 is concentrically mounted within the outer tube 6 by means of a telescoping engagement with an integral tubular portion 11 of the annular flange 2. The tubular portion 11 has a peripheral outer recess containing therein an O-ring 12 providing sealing engagement with the inner tube 10, and the screw 13 secures the assembly against relative axial movement. The entrance end of the inner tube 10 is concentrically engaged with an inturned annular flange 14 of the outer tube 6; the inner periphery of the annular flange 14 is provided with an annular recess containing therein an O-ring 15. Thus, there is formed an annular fluid tight air chamber 16 between the outer tube 6 and the inner tube 10, with the central through passageway being a part of the usual sealed lubricating oil sump of an internal combustion engine. The air chamber 16 will house the electrical components of the unit while the central through passageway will have therein the mechanism for containing and moving the sample material and reference material.

Figure 3:
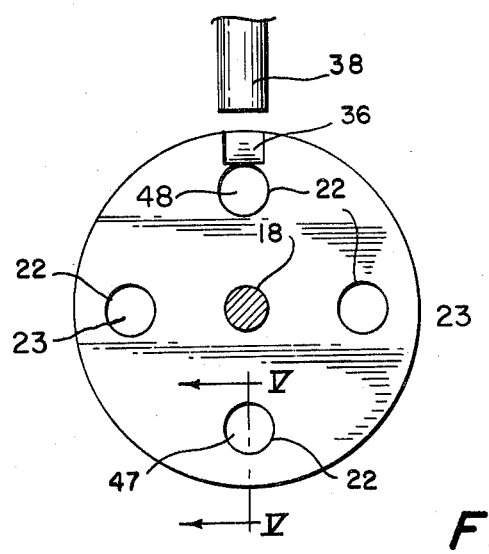
FIG. 3 is a cross-sectional view showing the reference and sample passages in the rotor along with the control reflecting surface on the rotor and the associated stationary control optical fiber, as viewed from line III—III in FIG. 1.
Figure 4:
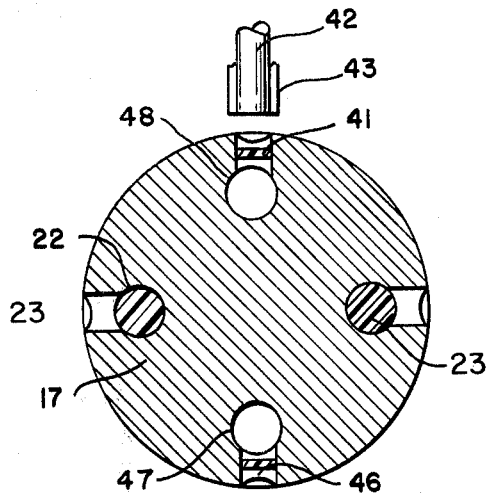
FIG. 4 is a cross-sectional view of the rotor showing the light scattering passages and the stationary optical fiber for picking up the scattered light, which is taken along line IV—IV of FIG. 1.

Concentrically within the central passageway is a rotor 17 rotatably mounted by means of opposed stub shafts 18 that are respectively received within the two sleeve bearings 19 that are carried by means of pillow blocks 20. The pillow blocks 20 are rigidly secured to the inner surface of the inner tube 10 by means of suitable screws 21, welding or the like. As shown more particularly in FIGS. 3 and 4, the rotor 17 has two sets of diametrically opposed axially extending through passages 22. Only passage 22 of each set has therein the reference material, for example, a Pyrex glass rod 23. The rod 23 may be constructed of any light conducting or passing material that will approximate the desired optical characteristics or properties of the sample to be tested, with the sample in an acceptable condition. Diametrically opposed passage 22 of each set contains therein the sample liquid material, for example oil, to be tested and monitored.

Figure 5:
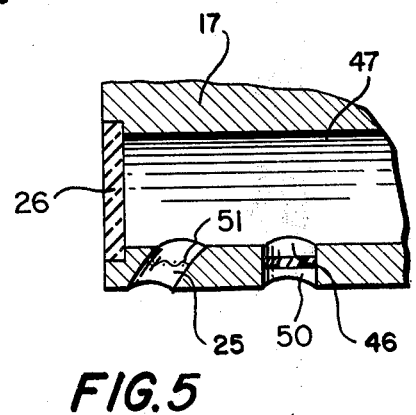
FIG. 5 is a partial cross-sectional view taken along the V—V of FIG. 3 to show the window, oil inlet, air bubble filter screen and scattered light outlet for liquid sample holding passage.
Figure 2:
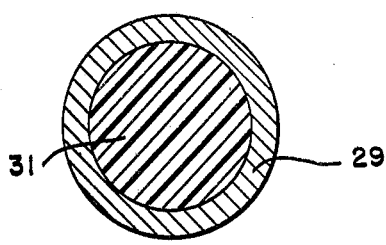
FIG. 2 is a cross-sectional view through an optical fiber element controlling the passage of light taken along line II—II in FIG. 1.

Around the exit periphery of the rotor 17 there are provided a plurality of radially extending blades or vanes 24, which will act as turbine blades to rotate the rotor 17 when oil moves through the central through passageway in either direction or alternatively, a suitable motor may be connected to one of the stub shafts 18 to drive the rotor 17 so that the blades 24 will act as axial pump blades for moving the oil through the central passageway. In either event, the oil will continuously move through the sample passage 22 by entering at the entrance end through slanted inlets 25, traveling axially and axially exiting from the outlet ends of passages 22, as shown in FIGS. 1 and 5. As shown in FIG. 5, the entrance end of the sample passage 22 is provided with a glass or plastic disc window 26 which will have two faces exposed to the oil for approximating the discoloration or clouding effect produced on the opposed ends of the reference material rod 23.

As further shown in FIG. 1, a suitable light source 27 is mounted within housing 28 secured by welding or the like to the outer surface of the inner tube 10 A protective tube 29 extends from within the housing 28 aligned with the light source 27 through the unit tube 10 to where it is bent 90° so that its end has its axis parallel to the adjacent through passage 22. A suitable O-ring or bead and recess snap coupling 30 is provided to securely hold the protective tube 29 within the housing 28 and form a fluid tight seal. The snap coupling is particularly desirable if the elements are made from resilient plastic material. Within the protective tube 29, there is disposed for its full length an optical fiber 31 which has substantially the same outer diameter as the inner diameter of the protective tube 29 with the intervening space being filled with a suitable sealing material. This optical fiber 31 conducts the light from the light source 27 to within the central through passageway so that it is projected axially through the aligned adjacent passage 22 of the rotor 17. After traversing the aligned through passage 22, the light is picked up by means of an optical fiber 32 contained within a protective tube 33 where it is conducted to impinge upon the sensitive surface of a photo-transistor 34, which is suitably mounted within housing 35 that is welded to the outer surface of the inner tube 10. The light picked up by the optical fiber 32 will be affected by the attenuation characteristics of the material within the aligned through passage 22, for example the chemical breakdown of the lubricating oil. This attenuation will have a corresponding effect upon the output signal produced by the photo-transistor 34.

Immediately adjacent the through passage 22 having therein the reference material 23, there is a reflective surface 36 on the outer periphery of the rotor 17 so that light being projected by the optical fiber 31 is reflected radially to be picked up by the radially aligned optical fiber 37 sealed within the protective tube 38, so that the reflected light is directed to the sensitive surface of a control photo-transistor 39. Thus, the photo-transistor 39 will have an output control signal indicative of the position of the rotor 17, that is a signal pulse will be produced by the photo-transistor 39 each time that the reference material 23 is aligned between the optical fibers 31 and 32. It is also contemplated that the reflective surface 36 could be adjacent the through passage 22 carrying the lubricating oil, instead of in its indicated position, in which case a control signal pulse would be produced each time that the sample material is aligned between the optical fibers 31, 32. The photo-transistor 39 is contained within a suitable housing 40, which is similar to the previously mentioned housings 28, 35, and has correspondingly similar O-ring or coupling 30.

Particle contamination or foam within the oil sample and the optical properties of the reference material 23 will scatter the light traveling therethrough, respectively. The light scattered by the reference material 23 will move at right angles to the axis of its passage 22 where some of it will escape through the additional radial passage 41 where it will be picked up by the aligned optical fiber 42 carried within the protective tube 43 so that it will impinge upon the lower sensitive surface of the photo-transistor 44 that is carried in the housing 45. The housing 45 is constructed and mounted similarly to the previously described housings. The photo-transistor 44 will produce a reference output electrical scattering signal correlated to the scattering effect of the reference material 23. In a like manner, light scattered by the oil sample, when the oil sample passage 22 is aligned between the optical fibers 31, 32, will pass through the radially extending additional passage 46 to be picked up by the optical fiber 42 to produce a corresponding sample electrical scattering signal with a photo-transistor 44.

When there is foam in the oil or other liquid, the bubbles will be filtered out and broken up by the filter screen 51, which only leads to passage 47 and not to passage 48. The filter screen is of a size that will freely pass the normal particle impurities, but will not pass the air bubbles of foam. Preferably the screen will be 105 mesh screening with 0.003 inch diameter stainless steel wire. Thus, it is seen that the passage 48 will contain unfiltered oil or other liquid, that is, liquid that may have foam or gas bubbles in it. When passage 48 is aligned with the light beam coming from fiber optic rod 31, the photo-transistor 44 will produce an electrical signal correlated to the amount of light scattered by both the impurities in the oil and the foam, and the photo-transistor 34 will correspondingly produce an electric signal output correlated to the light attenuated by the impurities, foam and chemical breakdown of the liquid. Similarly, when passage 47 is aligned with the optical fibers, the electrical signal outputs of photo-transistors 44 and 34 will not be affected by foam or other gas bubbles within the liquid. From FIG. 5, it is seen that a lens or other transparent window 50 is provided in the passage 46 leading to the passage 47 so that all of the oil entering the passage 47 must pass through the screen 51 or a similar screen at the opposite end of passageway 22 depending upon direction of oil flow.

Figure 6:
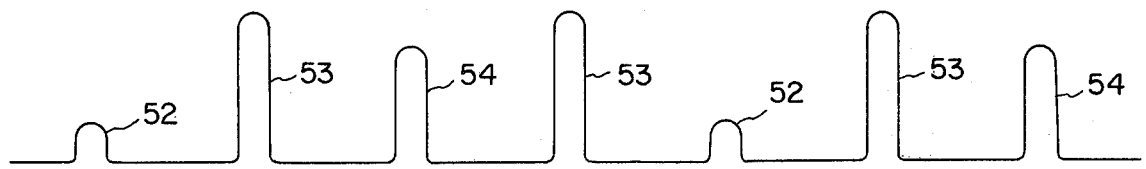
FIG. 6 is a plot of the electrical output signal for the attenuated light beam, and showing signal peaks in the repeatative pattern of sample with foam, reference, sample without foam, and reference.

In FIG. 6 there is shown the wave form for the electrical signal produced by the attenuation photo-transistor 34 during rotation of the rotor 17. Pulse 52 corresponds to the electrical signal produced when passage 48 containing unfiltered foam oil is aligned with the fiber optics; pulse 53 corresponds to the electrical signal produced when one of the reference material rods 23 is aligned with the fiber optics for attenuation of the light beam; pulse 54 corresponds to the electrical output signal produced when passage 47 containing filtered oil is aligned with the optical fibers; and the alternate pulse 53 corresponds to the electrical signal produced by the other reference material rod 23 when it is aligned between the optical fibers. The repeat pattern is produced during rotation of the rotor 17 so that the signal pulses will be correlated to the light scattered by unfiltered oil, reference material, filtered oil, reference material, unfiltered oil, reference material, filtered oil, etc. These signals may be separated and compared with each other. For example, electrical pulse 53 may be compared with electrical pulse 54, which would correspond to comparing the attenuation properties of the reference material with the attenuation properties of the filtered oil, so that the differential would be correlated to the chemical breakdown and particle impurity of the oil. Similarly, electrical pulse 52 may be compared with electrical pulse 54, which would provide a comparison of the foam oil with the filtered oil, so that the differential signal would be correlated to the amount of foam present within the oil, which differential signal may be used to operate a warning light, signal or the like.

Figure 7:
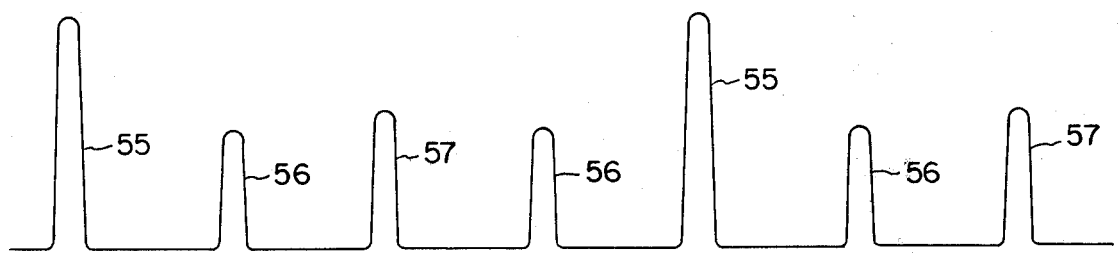
FIG. 7 is a plot of the electrical output signal for the scattered test light, and showing signal peaks in the repeatative pattern of sample with foam, reference, sample without foam, and reference.

The wave form shown in FIG. 7 is obtained from the phototransistor 44 and corresponds to the scattering pulses produced when the rotor 17 is rotated continuously in one direction. The electrical pulse 55 is produced when the passage 48 containing unfiltered oil is aligned with the optical fibers, it is seen that this pulse is relatively greater than the other pulses because of the considerable light scattering properties of foam. Electrical pulse 56 is obtained when the reference material 23 is aligned with the optical fibers. Electrical pulse 57 is slightly larger than electrical pulse 56 and corresponds to the light scattering properties when the filtered oil within passage 47 is aligned with the optical fibers. By separating the electrical signals, comparisons similar to those above may be made. For example, the scattering pulse 55 produced by the unfiltered oil may be compared with the scattering pulse 57 produced by the filtered oil, so that the differential electrical signal will be correlated to the amount of foam within the system. Also, reference pulse 56 may be compared with the scattering filtered oil pulse 57, so that the differential electrical signal will be correlated to the amount of particle impurities within the entire system. Thus, it is seen that it is essential that the wire screen filter does not impede the passage of particle impurities, because it is necessary for these particle impurities to enter both passages 47 and 48 so that their effects may be measured to obtain a reading of their quantity.

Figure 8:
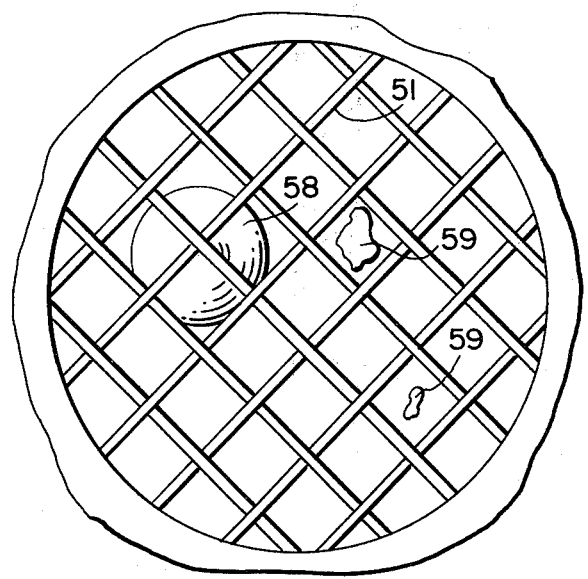
FIG. 8 is an enlarged view of the filter stopping and breaking bubbles of foam while freely passing particle impurities.

The size relationship between the filter screen 51, a gas bubble 58 and particle impurities 59 shown on a greatly enlarged scale in FIG. 8. From this Figure, it is seen that the screen is of such a size that generally all of the particle impurities will freely pass through the screen, while the screen will block and/or breakdown the gas bubbles of the foam.

OPERATION

Although the operation of the oil monitor has been described above in connection the detailed description of the various components, it will be summarized below.

The oil monitor sensor of FIG. 1 may be placed in the lubrication oil sump for an aircraft engine, for example. The rotor 17 may be freely rotatable as shown so that the engine oil pump will circulate oil through the sensor from aperture 5 to aperture 4 so that the blades 24 will act as turbine blades to rotate the rotor 17. It is contemplated that the flow of oil through the sensor may be in the opposite direction, that is, from aperture 4 to aperture 5 with the only modification being the placement of the foam screen. As the rotor 17 rotates, the through passage 47 containing therein the liquid material that has had foam filtered from it will move into alignment with the optical fibers 31, 32 successively with one of the adjacent passages 22 having therein the reference material 23, the diametrically opposed passage 48 having therein foam containing oil, and the other passage 22 having therein reference material 23. This sequence will be repeated as the rotor is continuously rotated in one direction. If the oil is static, where the sensor is placed, a motor may be provided to rotate the rotor 17 and provide a pumping action by the blades 24 for moving the oil through the sensor.

With the above sequential positioning of the oil and sample materials in the light circuit as defined by alignment with the optical fibers 31 and 32, the scattering sensor 44 will produce correspondingly a signal composed of the repeat pattern of pulses corresponding to the scattering effect of the filtered oil, reference material, foam containing oil, and reference material; simultaneously, the sensor 34 will produce a signal composed of a plurality of pulses corresponding to the attenuation affect of the filtered oil, reference material, foam containing oil, and reference material. These signals are shown in FIGS. 6 and 7, wherein FIG. 6 is the electrical signal output of sensor 34 with pulses 52 correlated to the attenuation affect of the oil with all of its particle impurities and all of its foam, pulses 53 correlated to the attenuation affect of the reference material, and pulses 54 correlated to the attenuation affect of the oil with all of its particle impurities but without its foam. Similarly, FIG. 7 is the electrical signal output of sensor 44, wherein the pulses 55 are correlated to the scattering affect of the oil with all of its particle impurities and all of its foam, pulses 56 correlated to the scattering affect of the reference material, and pulses 57 correlated to the scattering affect of the oil containing all of its particle impurities, but without foam. Thus, it is seen that a comparison of pulses 55 and 57 will produce a differential signal correlated to the scattering affect solely due to the foam, which in turn is correlated to the amount of foam. A comparison of pulses 56 and 57 will yield a differential that is correlated to the scattering affect of the particle impurities, which in turn will be correlated to the amount of particle impurities. Similarly, a comparison of pulses 52 and 54 will produce a differential correlated to the amount of foaming whereas a comparison of pulses, 53 and 54 will be correlated to the attenuation affect of particle impurities and chemical breakdown. Broadly, the invention is applicable to any liquid material containing therein foam and particle impurities, where it is desirable to measure the effect of the particle impurities without an error being introduced by the foam and/or measuring the amount of foam without errors being introduced by the amount of particle impurities. Suitable signals, recording instruments and the like may be incorporated in an amplifying circuit similar to that of the above-mentioned copending application.

Several embodiments, modifications and variations have been shown and described in detail to illustrate that the basic principles and inventive features of the preferred embodiment are contemplated to be used in further and widely different applications according to the spirit and scope of the invention.

What is claimed is:

1. The method of monitoring a liquid, subject to foaming, for the presence of particle impurities generally of a size to freely pass through a predetermined minimum filter screen mesh and separately for the presence of foam, comprising the steps of: dividing the liquid to be monitored into at least a first moving stream and a second moving stream; filtering foam from the first stream while allowing the free passage of the particle contamination; monitoring the thus foam filtered first stream by passing a beam of light through the thus filtered first stream with its particle contamination and producing a first electrical signal from the effect the fluid particle contamination of the first stream has upon the beam of light; monitoring the unfiltered second stream of liquid by passing a beam of light through the unfiltered second stream with its foam and particle contamination, and producing a second electrical signal from the effect the particle and foam contamination of the second stream of liquid has upon the beam of light; producing a third electrical signal correlated to the effect of the liquid without any particle contamination and without any foam upon a beam of light; differentially comparing the first and second electrical signals to produce an output signal correlated to the amount of foam in the liquid; and differentially comparing the first and third electrical signals to produce an output signal correlated to the amount of particle contamination in the liquid.

2. The method of claim 1, wherein the step of filtering foam, passes all particles of a size that will pass through a 105 mesh screen of 0.003 inch diameter wire.

3. The method of claim 1, wherein said first and second monitoring steps are conducted separately and alternately; and the step of producing a third electrical signal is conducted alternately with each of said steps of monitoring.

4. An apparatus for separately testing the particle and foam impurities in a moving liquid by comparing it with a known reference material, comprising: means for dividing the liquid into a first stream and a separate second stream; first measuring means including a light source and a light responsive transducer for passing a beam of light through the first liquid stream with all of its particle and foam contamination for producing a first electrical signal correlated to the effect the liquid particle and foam contamination has upon the passed beam of light; second means including a light source and a light responsive transducer for passing a beam of light through the reference material and producing a second electrical signal correlated to the effect the reference material has upon the passed beam of light; means filtering only the foam from the second liquid stream and freely passing the particle contamination; and third measuring means including a light source and a light responsive transducer for passing a beam of light through the filtered second liquid stream and producing a third electrical signal correlated to the effect the light particle contamination has upon the passed beam of light; first comparison means producing a foam quantity indication signal from only the first and third electrical signals; and separate second comparison means producing a particle quantity indication signal from only the second and third electrical signals.

5. The device of claim 4, wherein said filtering means includes a screen of about 105 mesh constructed of 0.003 inch diameter stainless steel wire.

6. The device of claim 4, wherein each of said first measuring means, second measuring means and third measuring means includes a common light responsive transducer having a single output electrical line and producing in said single electrical output line a repeat pattern of the first electrical signal, the second electrical signal, the third electrical signal, and the second electrical signal.

7. The device of claim 6, wherein all of said measuring means for passing a beam of light includes a common light source, and said filtering means includes a screen of about 105 mesh constructed of 0.003 inch diameter stainless steel wire.

8. The device of claim 4, wherein all of said measuring means for passing a beam of light include a common light source and a common light receiving transducer for converting the received light into the respective electrical signal.

* * * * *